March 15, 1960    W. G. NEILD    2,929,039
ELECTRIC REGULATOR
Filed Feb. 17, 1956

INVENTOR.
WILLIAM G. NEILD
BY
ATTORNEY

United States Patent Office 2,929,039
Patented Mar. 15, 1960

2,929,039

ELECTRIC REGULATOR

William G. Neild, Fair Haven, N.J., assignor to Bendix Aviation Corporation, Eatontown, N.J., a corporation of Delaware Application February 17, 1956, Serial No. 566,137

6 Claims. (Cl. 338—103)

The present invention relates to electrical regulators of the variable resistance type and more particularly to carbon pile regulators for operation at high temperatures.

Carbon pile regulators are widely used for controlling the voltage, current and frequency of dynamoelectric machines. These carbon pile regulators operate on the principle of varying the pressure applied to the carbon pile. One end of the pile is relatively fixed. Operatively associated with the other end to apply pressure on the pile is an armature carried by a diaphragm spring which tends to urge the armature towards the pile. An electromagnet, when energized, tends to withdraw the armature from the pile against the bias of the diaphragm spring. For proper operation, it is necessary for the electromagnetic force acting upon the armature to match the spring characteristics as the air gap varies. Heretofore, the requirements were such that ambient temperature and wattage, required to be dissipated, did not raise the temperature of the diaphragm spring to a point wherein its spring characteristics were affected. Such springs were usually made out of beryllium copper.

Now, the requirements are such that the carbon pile regulator operates continuously in a high ambient temperature and dissipates the wattage generated in the carbon pile at the same time. Under these conditions, the temperature of the diaphragm spring reaches a value wherein the beryllium copper spring loses its strength. This causes the regulated voltage to decrease to a point at which the regulator becomes unserviceable.

In order to overcome the aforenoted unsatisfactory condition, spring material of high temperature stainless steel was investigated. It was found that the regulator, when using the above material for the diaphragm spring, would work satisfactorily except when the regulator was cooled to normal room temperature. From a cold start, the regulated voltage would be high and would gradually decrease to a stable value. This action is contrary to the effect normally encountered in an electromagnetic device, such as a carbon pile regulator, when temperature effects due to the coil heating causes the voltage to start low and gradually increase with temperature. It was found that the undesirable effect, described above, was due to the spring increasing its stiffness when cold.

The present invention provides means for compensating for this increased stiffness in the spring when the regulator is cold, yet have no adverse effect after the regulator heats up.

It is an object of the invention to provide an improved electric regulator.

Another object of the invention is to provide an improved electric regulator adapted for operation over a wide range of temperatures.

Another object of the invention is to provide an improved carbon pile regulator adapted for operation at high temperatures.

Another object of the invention is to provide temperature compensating means for an electromagnetic device.

The above and other objects and features of the invention will appear more fully hereinafter from a consideration of the following description taken in connection with the accompanying drawing, wherein one embodiment of the invention is illustrated by way of example.

Figure 1:
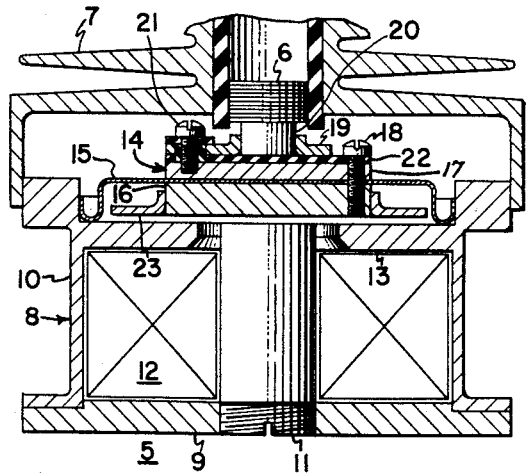
Figure 1 is a cross sectional view of the electromagnet and armature section of a carbon pile regulator embodying the invention.

Referring now to Figure 1, a carbon pile regulator is indicated generally by the numeral 5, only that portion of the regulator housing the electromagnet and armature is illustrated. The regulator 5 has a carbon pile 6, housing and cooling fins 7 and electromagnet case 8. The case 8 has a bottom plate 9 which supports a casing 10. The plate 9 and casing 10 are formed of a suitable ferromagnetic material. A core 11 of similar ferromagnetic material is screw threaded to the plate 9 and projects into an electromagnetic winding 12 positioned within the casing 10 between the plate 9 and a flange 13, extending inward and forming the pole face for the electromagnet assembly.

An armature assembly 14 is positioned in the casing 10 and has a diaphragm type spring 15 seated on the flange 13. The spring 15 is of a suitable stainless steel material. An armature plate 16 is positioned on the side of the spring 15 adjacent to the core 11. On the opposite side of the spring 15, a clamping plate 17 is positioned so that the spring 15 is clamped between the plates 16 and 17 by suitable fastening screws 18. A cup shaped member 19, adapted to hold a contact member 20, is mounted on the plate 17 by screws 21. An insulating member 22 insulates the member 19 from the plate 17.

The armature plate 16 is formed of a suitable ferromagnetic material. A flanged member 23 is secured to the armature plate 16. The member 23 is formed of a nickel-iron temperature sensitive magnetic material which is characterized by the ability to vary its permeability with temperature, becoming more magnetic when cold and less to non-magnetic when hot. As an example, a nickel-iron alloy containing 30 percent nickel will be fully magnetic at minus 20 degrees F. Upon being heated, it will loose in magnetic permeability at a rate approximately proportional to increase in temperature until at a temperature of approximately 130 degrees F., it becomes virtually nonmagnetic.

Figure 2:
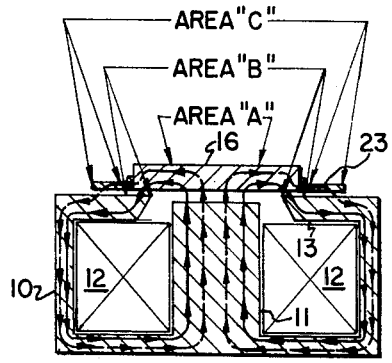
Figures 2 and 3 are diagrammatical representations of the electromagnetic structure for an explanation of the invention.
Figure 3:
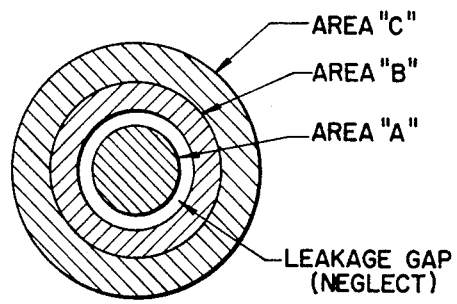

Reference is now made to Figures 2 and 3, in which the magnetic circuit has been illustrated diagrammatically for an explanation of the invention. The armature assembly 14 can be considered as being divided into three areas, namely area A, area B and area C. Neglecting magnetic leakage, Figure 2 shows that without the flanged member 23, the magnetic lines of force passing through area A pass through area B as indicated by the solid arrows. The magnetic force exerted varies as the square of the flux density and area A being smaller than area B exerts a greater pull. By the addition of the flanged member 23, area C is created which effectively increases area B thereby causing an increase in flux density in area A, as indicated by the dashed arrows. This causes an increased pull for the same NI in the coil.

By making the member 23 of a temperature sensitive magnetic material, which has the characteristic of varying its permeability with temperature, it becomes more magnetic when cold and less to non-magnetic when hot. With a constant air gap and a constant NI in the coil, the total magnetic pull on the armature assembly is greater when the regulator is cold than when hot and decreases until the member 23 becomes non-magnetic. Inasmuch as the member 23 is located in close physical proximity to the spring 15, it is heated at approximately the same rate as the spring by the carbon pile.

Figure 4:
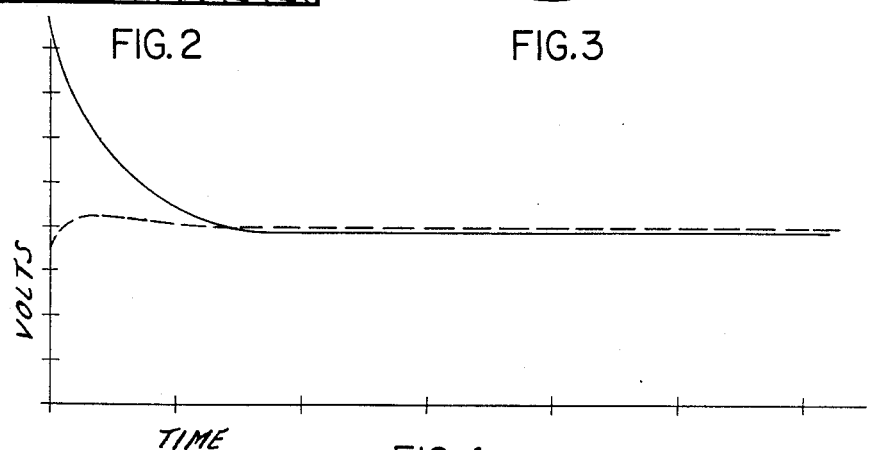
Figure 4 is a graph illustrating the operation of the device.

By the selection of the proper material having the desired characteristics and size of the member 23, the temperature pull characteristics of the electromagnet can be made to match the temperature pull characteristics of the spring, which will result in the proper operation of the regulator. In Figure 4, the solid curve illustrates the action of the regulator without the member 23, with regulated volts plotted against time. The dashed curve illustrates the action of the regulator with the member 23.

Although only one embodiment of the invention has been illustrated and described, various changes in the form and relative arrangement of the parts, which will now appear to those skilled in the art, may be made without departing from the scope of the invention.

What is claimed is:

1. An electric regulator including a variable resistance element, an electromagnet having an essentially non-linear magnetic force characteristic and including a fixed pole piece, a winding, an armature for controlling said resistor element, spring means supported by said pole piece and carrying said armature, said spring means being characterized by increased stiffness when cold, and temperature responsive means secured to said armature, said means being a nickel-iron material which is magnetic when cold and less magnetic with increasing temperature.

2. In an electric regulator having a variable resistance element and an electromagnet for controlling said element, an armature assembly comprising a spring member of a material having a temperature sensitive spring characteristic, an armature member carried by said spring member, said armature having a portion thereof of a nickel-iron material having a temperature sensitive magnetic characteristic whereby the magnetic pull of said armature matches the characteristic of said spring.

3. In an electric regulator having a variable resistance element and an electromagnet for controlling said element, an armature assembly comprising a spring member having changing spring characteristics with temperature, and an armature member including a portion of nickel-iron material having changing magnetic characteristics with temperature whereby the electromagnetic forces acting upon said armature member match said spring characteristics.

4. In a carbon pile regulator having an electromagnet for controlling the compression thereof, an armature assembly comprising a spring member having changing spring characteristics with temperature for biasing said carbon pile in one direction, an armature member including a section of nickel-iron material having changing magnetic characteristics with temperature for opposing the bias of said spring whereby said regulator is substantially independent of temperature changes therein.

5. In a carbon pile regulator, electromagnetic means for controlling the compression thereof comprising a control winding, an armature of ferromagnetic material, a stainless steel diaphragm spring supporting said armature, and a ring of a nickel-iron material having magnetic properties when cold and decreasing magnetic properties when heated secured to said armature.

6. In a carbon pile regulator having an electromagnet for controlling the resistance thereof, an armature assembly comprising a stainless steel diaphragm spring having temperature sensitive spring characteristics, and an armature member carried by said spring, said armature member having an inner section of a ferromagnetic material and an outer section of a nickel-iron material having temperature sensitive magnetic properties.

References Cited in the file of this patent
UNITED STATES PATENTS

| | | |
|---|---|---|
| 1,914,909 | Creveling | June 20, 1933 |
| 2,478,835 | Rady et al. | Aug. 9, 1949 |

FOREIGN PATENTS

| | | |
|---|---|---|
| 446,255 | Great Britain | July 24, 1934 |

OTHER REFERENCES

"Instruments" (Jackson and Russell), published November 1938 (page 280 relied on).

"Standard Handbook for Electrical Engineers" (A. E. Knowlton), McGraw-Hill Book Co., seventh edition.